United States Patent
Deshpande et al.

(10) Patent No.: US 10,305,697 B2
(45) Date of Patent: May 28, 2019

(54) HANDLING EXCESS TRAVEL-RELATED INFORMATION

(71) Applicant: iHeartMedia Management Services, Inc., San Antonio, TX (US)

(72) Inventors: Amit Deshpande, Cincinnati, OH (US); Jeffrey Lee Littlejohn, Cincinnati, OH (US); Abineshraj Rajagopal, Maineville, OH (US)

(73) Assignee: iHeartMedia Management Services, Inc., San Antonio, TX (US)

(*) Notice: Subject to any disclaimer, the term of this patent is extended or adjusted under 35 U.S.C. 154(b) by 149 days.

(21) Appl. No.: 15/633,943

(22) Filed: Jun. 27, 2017

(65) Prior Publication Data

US 2018/0375677 A1   Dec. 27, 2018

(51) Int. Cl.
| | |
|---|---|
| H04L 12/18 | (2006.01) |
| G01C 21/30 | (2006.01) |
| H04H 20/55 | (2008.01) |
| H04L 29/08 | (2006.01) |

(52) U.S. Cl.
CPC ......... H04L 12/1877 (2013.01); H04H 20/55 (2013.01); H04L 12/189 (2013.01); H04L 12/1845 (2013.01); H04L 67/1014 (2013.01); *H04H 2201/18* (2013.01); *H04H 2201/90* (2013.01)

(58) Field of Classification Search
CPC ... G08G 11/017; G08G 1/092; G01C 21/3688
USPC ....... 709/206; 701/1, 36, 117, 208; 370/206, 370/230, 231, 235
See application file for complete search history.

(56) References Cited

U.S. PATENT DOCUMENTS

| | | | |
|---|---|---|---|
| 8,264,375 B2 * | 9/2012 | DeVries | G08G 1/092 340/901 |
| 9,026,346 B2 | 5/2015 | Choi | |
| 9,148,330 B2 | 9/2015 | Samsalovic | |
| 9,593,955 B2 | 3/2017 | Pfeifle | |
| 2014/0304321 A1 | 10/2014 | Stroila | |

(Continued)

OTHER PUBLICATIONS

"TPEG—What is it all about"—TISA, Jan. 27, 2014 http://tisa.org/wp-content/uploads/documents/TISA14001TPEGWhatisitallabout2014.pdf.*

(Continued)

*Primary Examiner* — Randy A Scott
(74) *Attorney, Agent, or Firm* — Garlick & Markison; Edward J. Marshall

(57) ABSTRACT

Travel-related-information messages (TRIMS) are received from one or more information sources, and information included in the messages is placed into a first (e.g. TPEG™) or second (e.g. TPEG+) group. A determination is made that a first TRIM reporting message including information from the first group will exceed a permissible size, so excess information is removed from the first group and added to the second group, thereby decreasing the size of the first TRIM reporting message to the permissible message size or less. Some or all of the excess information removed from the first group is added to the second group. First and second TRIM reporting messages are generated from information included in the first and second groups. The first and second TRIM reporting messages are transmitted to end-user devices using different service ports.

20 Claims, 10 Drawing Sheets

(56) References Cited

U.S. PATENT DOCUMENTS

2014/0317124 A1   10/2014   Kosuru et al.
2016/0104377 A1*   4/2016   French ................... H04H 20/55
                                                                                                                    701/117

OTHER PUBLICATIONS

AVT Audio Video Technologies, MAGIC DAB Headend, promotional brochure, Germany, 2014, 2 pages.

Burfeind, Mark; INRIX TPEG Connect™ Optimizes Delivery and Reduces Costs of Providing Dynamic Traffic Info to Connected Vehicles and Devices; Jul. 28, 2010, 2 pages, http://inrix.com/press/2656/.

Consumer Electronics Association, National Association of Broadcasters, National Radio systems Committee, RBDS Standard NRSC-4-B, Apr. 2011, pp. 1-36, United States.

Definitions for Classes 1 through 7 of the BIA IRR Program, 2012.

Francis, Dave, TISA—building standards in Automotive Traffic Information Services, Taiwan Telematics 2012, Nov. 8, 2012, 34 pages.

Francis, Dave; TPEG Digital Radio Traffic Data, Next generation of Traffic and Travel Information Services; 2010, 23 pages.

Consumer Electronics Association, National Association of Broadcasters, National Radio systems Committee, Broadcasting Standard NRSC-5-C, Sep. 2011, pp. 1-53, United States.

Gardiner, P.A.O. , Implementing TPEG and Multimedia Services for Digital Radio, British Broadcasting Corporation, UK, Dec. 1999, 6 pages.

Marks, Bev, TPEG—an introduction to the growing family of standards and specifications for Traffic and Travel Information services, Jun. 10, 2009, 53 pages.

TPEG Analyser; http://wecantpeg.com/tpeg-analyser.html, Nov. 19, 2015.

We Can TPEG; 2 pages, http://wecantpeg.com/TPEG_Analyser_4_1.pdf, Oct. 1, 2015.

Wikipedia, TPEG, website, Apr. 20, 2016, pp. 1-17.

\* cited by examiner

HANDLING EXCESS TRAVEL-RELATED INFORMATION

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to broadcast traffic information, and more particularly to adjusting the amount of travel-related information included in a reporting message by including excess travel-related information in an additional reporting message.

2. Description of Related Art

Traffic information can be collected and transmitted to users via a packet switched network using Transport Protocol Experts Group (TPEG™) frames, such as the Internet; via satellite; or using in-band-on-channel (IBOC) techniques, including digital audio broadcast (DAB) and HD™ radio broadcasts. Various IBOC techniques can be used to broadcast Transport Protocol Experts Group (TPEG™) frames.

Current distribution methods may provide limited bandwidth for transmitting traffic information and other data. Additionally, various end-user devices included in some automotive applications impose data size restraints on TPEG™ or other travel-related messages. These data and bandwidth limitations restrict the size of the payload that can be reliably delivered to vehicles in a broadcast area, and makes it difficult to expand traffic flow coverage to smaller roads, such as surface streets, in the broadcast area of large metropolitan areas. Delivery of other travel-related information, such as travel-flow predictions, parking information, road conditions, and localized incident information may also be limited by data size constraints associated with end user devices. The inclusion of information associated with smaller roads, providing additional predictive information, and providing more granular traffic information can be desirable to provide a better user experience for drivers and accurate time to destination, but may not be possible given limitations of current systems and techniques.

In general, currently available systems deal with excess information by limiting the information delivered to end users. For example, in an effort to decrease the amount of traffic data in a given area, information about smaller roadways and streets in that area might not be delivered to end users. Other information, such as some predictive information, might be provided only for the largest roads, or might be completely omitted from traffic messages sent to end users in the interest of keeping the size of the messages within acceptable data processing limits.

In view of the above, it is apparent that currently available technologies are less than perfect.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
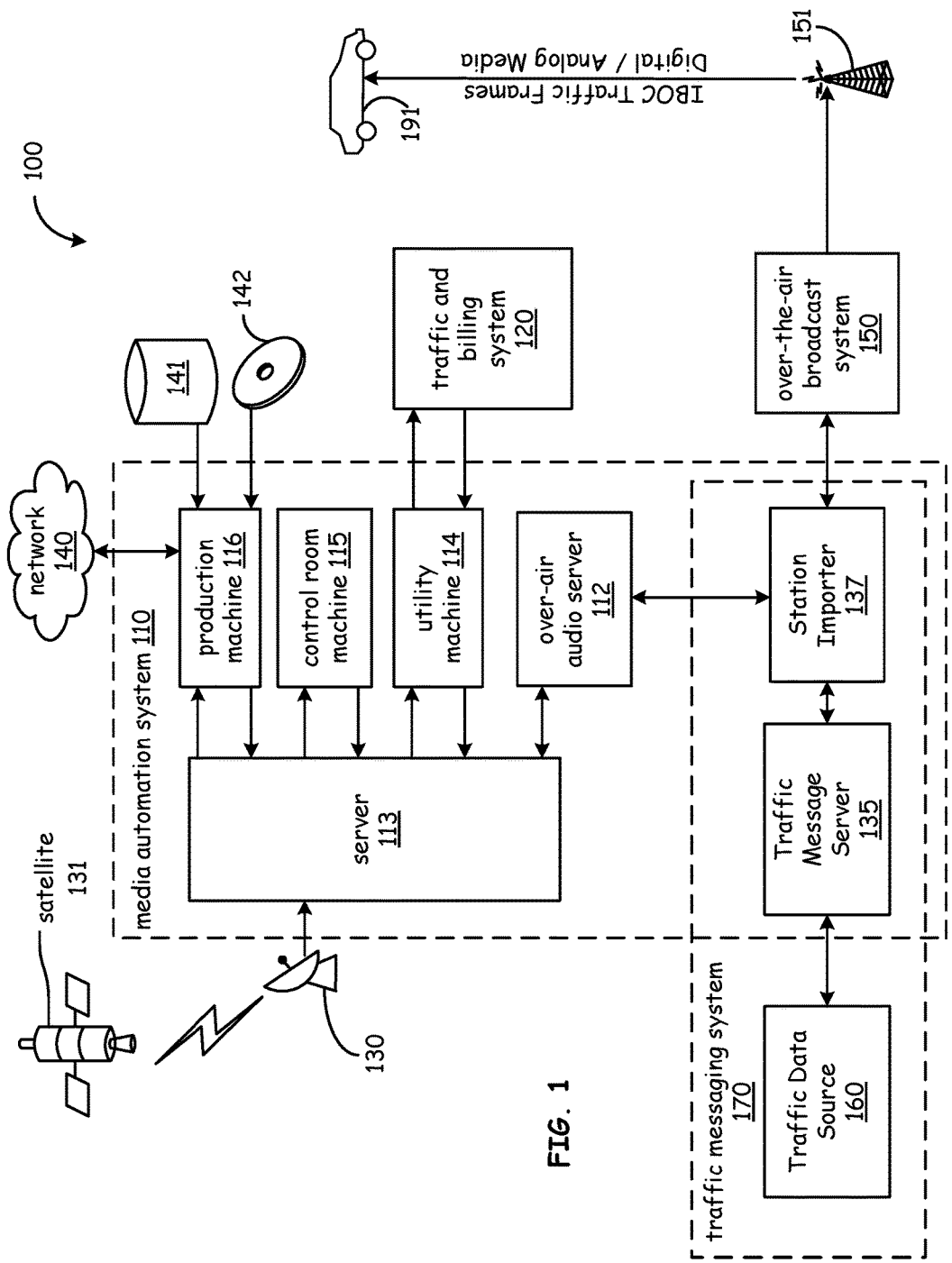
FIG. 1 is a block diagram of a broadcasting system, including a traffic messaging system, in accordance with various embodiments of the present disclosure.

Various embodiments discussed herein generate multiple travel-related-information reporting messages ("TRIM reporting messages"), which are broadcast to various end user devices, sometimes referred to as "head units." Head units can include, but are not limited to, navigation appliances, HD™ radios, and/or other portable and vehicle-integrated devices that receive and process travel related information such as traffic, parking, transportation status and scheduling, weather, fuel pricing, route information, congestion predictions, or some combination thereof. The discussion and explanations herein are generally made in terms of messages in a Transport Protocol Experts Group (TPEG™) or similar protocol, but the principles and techniques can be applied in conjunction with other traffic and travel message protocols.

In the context of this application, the terms "reporting messages," "TRIM reporting messages," and various derivative terms, encompass both conventional, or standard TPEG™ traffic messages delivered to head units, and to what are referred to herein as a TPEG+ messages. In at least some embodiments, a standard TPEG™ traffic message can be used to deliver conventional TPEG™ information to both "legacy" and non-legacy TPEG™ head units, while a TPEG+ frame can be used to deliver "extra" travel-related information, beyond what is included in the TPEG™ message, to non-legacy TPEG™ head units. For example, traffic information and basic predictive information related to larger roadways can be broadcast in a TPEG™ message for use by both legacy and non-legacy head units in a particular broadcast area, while information about smaller roadways, advanced predictive information, parking information, and more detailed or granular information about particular incidents can be broadcast in a TPEG+ message for use by non-legacy head unit in that same broadcast area. Legacy head units can effectively ignore the TPEG+ message, thereby allowing non-legacy head units to use more of their capabilities, while still permitting legacy head units to receive the same travel-related information they have always received.

Both the TPEG™ and TPEG+ messages are referred to herein as "TRIM reporting messages," because they package information from travel-related-information messages (TRIMs), which can be received from various sources, into messages used to "report" that information to head units. In some implementations, TRIMs associated with particular, usually larger or more important, road classes are included in TPEG™ messages by default, while TRIMs associated with other road classes are included in TPEG+ messages by default. TPEG+ messages can also be used to deliver "auxiliary," or "extra" travel-related information, such as parking information, weather, predictive information, transportation schedules, granular incident information, or the like by default.

However, when the volume of information to be broadcast in a TPEG™ message exceeds a threshold, some of the information that would otherwise be included in the TPEG™ message, also referred to herein as "extra" travel-related information, can be moved to the TPEG+ message, in addition to the other information included in the TPEG+ message by default, in an effort to keep the TPEG™ message within predefined size limits. Dynamically moving extra information from a TPEG™ message to a TPEG+ message can be done in addition to, or in place of, other techniques to limit the size or content of TPEG™ messages delivered to head units.

Examples of techniques that can be used to limit the size of TPEG™ messages include: automatically adjusting the refresh rate of information included in a traffic frame if the system detects that the payload size is approaching a payload threshold limit; refreshing the information for larger roads more often than the information for smaller roads, and through the use of configurable sub-bounding areas, as discussed in more detail in U.S. patent application Ser. No. 15/162,951, filed May 24, 2016, and entitled "Broadcast Traffic Information Bounding Areas," which is incorporated herein by reference in its entirety.

Although various embodiments routinely generate multiple TRIM reporting messages, e.g. TPEG™ and TPEG+ messages, in some embodiments TPEG+ messages are generated only if there is too much information to include in the TPEG™ message.

The road classification convention referred to herein can assign the smallest number to the largest/most important roads, and the largest number to the smallest/least important roads, so a lower class road is usually larger than a higher class road, unless a smaller road has been assigned a lower number based on its importance to traffic flow or volume. For example, highways might be assigned to road class zero, while small residential streets might be assigned to road class nine. Other classification systems can also be used without departing from the spirit and scope of the present disclosure. For example, the Federal Highway Administration (FHWA) Bureau of Indian Affairs (BIA) Indian Reservation Roads (IRR) program uses a classification from 1-7, where major arterial roads are assigned to class 1, rural minor arterial roads are assigned to class 2, city local roads are assigned to class 3, rural major collector roads are assigned to class 4, rural local roads are assigned to class 5, city minor arterial streets are assigned to class 6, and city collector streets are assigned to class 7. Some implementations may assign lower classifications to smaller roads and higher classifications to smaller roads, but the principles described herein can still be applied in those cases.

Referring now to FIG. 1, a system 100 will be discussed according to various embodiments of the present disclosure. As illustrated, system 100 includes traffic messaging system 170; media automation system 110, for example a NexGen® automation system, which can control and automate various media broadcast functions; and traffic and billing system 120, for example a Viero® traffic system, which can provide control for various traffic and billing functions such as entering and editing orders, and scheduling spots. Any one or more of the elements of FIG. 1 can be implemented as part of a cloud based system and/or service providing the functionality described herein. It should be noted that the word "traffic," as used in conjunction with traffic and billing system 120 does not refer to vehicular traffic or mobility, but is a term of art referring to the scheduling and availability of programming and advertising material.

In general, traffic and billing system 120 can be used to provide control and monitoring of the sale and scheduling of spot blocks containing one or more spots for multiple different media stations, although only a single station is illustrated, and to determine which spot blocks are to be played on which broadcast stations at particular times. This information can be provided to server 113 in the form of a log file in some embodiments. Media automation system 110 can use server 113 to gather programming and media information from various sources, and combine that information with spot block information to generate a log file indicating a substantially complete representation of which media and spots are to be broadcast. The log file and related information can be provided to over-air audio server 112, and to a streaming audio server (not illustrated) for broadcast over their respective systems.

Media automation system 110, as illustrated, can also include production machine 116, which can obtain information from broadcasts in other markets via network 140. Production machine 116 can also obtain media from database 141, which may be a database local to production machine 116, or local to another server or machine that is part of media automation system 110. In other embodiments database 141 can be maintained by a third-party media provider, which can be remote from media automation system 110. Production machine 116 can also obtain media to be broadcast from individual media sources, such individual source media 142, which may include any of various non-volatile media storage elements, including but not limited to optical disks, e.g. compact discs (CDs), digital video disks (DVDs), various types of magnetic and electromagnetic storage media, or the like.

Production machine 116 can provide some or all of the media to be broadcast to server 113. In addition to the media provided to server 113 from production machine 116, satellite receiver 130 can also provide satellite content from satellite 131 to be inserted into a broadcast via over-air audio server 112. Server 113 can also receive media or other content to be broadcast from control room machine 115. Control room machine 115 may include a studio in which a live broadcast is being generated, such as a talk show or other similar live program, but control room machine 115 can also provide media to server 113 other than live media.

Additionally, control room machine 115 can provide server 113 with various control functions, and in some cases an operator can manually add or remove spots, programming, and other content that server 113 has previously slotted for broadcast. Thus, for example, an operator in control room machine 115 may determine that a previously scheduled spot in a particular spot block is not to be broadcast for any of various reasons. Upon making that determination, control room machine 115 can be used to send a signal to server 113. In response to the signal, server 113 can remove the spot from its previously scheduled spot block. In some embodiments, the removed, or "bumped" spot is not delivered to over-air audio server 112 for over-the-air broadcast.

Traffic and billing system 120 is, in some embodiments, connected to server 113 via a utility machine 114, which can be a processing device configured to provide user access to traffic and billing system 120, access to various combination of one or more functions or services provided by other machines, such as control room machine 115 and production machine 116, to provide user access to server 113, or some combination thereof. In at least one embodiment utility machine 114 can be specifically configured to act as a proxy between traffic and billing system 120 and one or more other machines included in media automation system 110. In other embodiments, traffic and billing system may be connected to server 113 through other machines, for example a control room machine 115, production machine 116, or directly connected to server 113. In other embodiments, traffic and billing system 120 and server 113 can be included in a single machine, or collection of machines that are co-located or connected in a distributed fashion. In yet further embodiments, traffic and billing system 120 can include local instances or subsystems associated with one or more media stations, and a backend subsystem used to provide centralized control or services to each of the local instances or subsystems. In at least one embodiment, all or part of media automation system 110, traffic and billing system 120, and/or other components illustrated in FIG. 1 can be implemented using one or more devices and/or systems that provide remote, cloud-based functionality and services to subscribers, broadcasters, scheduler's, end users, or the like.

Media automation system 110 can also include over-air audio server 112, which provides media content to over-the-air broadcast system 150 via station importer 137, or directly (not explicitly illustrated). Server 113 can provide audio, images, video, or mixed media content to over-air audio server 112. Note that even though an audio server is illustrated and discussed, the techniques and principles described herein can also be applied to images, video and mixed media content.

Traffic messaging system 170 can include Traffic Data Source 160, traffic message server 135, and station importer 137. In various embodiments, Traffic Data Source 160 is external to media automation system 110, while traffic message server 135, and station importer 137 are part of both Traffic messaging system 170 and media automation system 110. Traffic message server 135 receives traffic-related-information messages (TRIMs) from Traffic Data Source 160, packages the traffic messages and generates TRIM reporting messages, such as TPEG™ and TPEG+ messages, and transmits the TRIM reporting messages to station importer 137 for delivery to end user devices.

Station importer 137 is, in various implementations, a processing system used to: 1) create separate streams for different HD™ channels (e.g. HD2 and HD3 stations), and 2) package and multiplex data into an HD™ radio signal transmitted by over-the-air broadcast system 150. Although illustrated as an intermediary between over-air audio server 112 and over-the-air broadcast system 150, station importer 137 can, in some embodiments (not explicitly illustrated), be part of over-the-air broadcast system 150, or perform at least the data packaging and data multiplexing at or near the point at which over-the-air broadcast system 150 transmits media and advertising content to broadcast tower 151. In at least one embodiment, broadcast tower 151 transmits, to head units, such as automotive radio system 191, digital and/or analog media content and IBOC Traffic Frames received from over-the-air broadcast system 150.

The terms traffic frame and traffic message are sometimes used interchangeably herein, and refer to the fact that a traffic frame, such as a TPEG™ frame, included in an HD™ broadcast to automotive radio system 191 is, in a broad sense, a "message" that includes traffic-related information. However, in other instances the term "traffic message" is used to refer to travel-related-information messages (TRIMs) that include traffic information relating to particular traffic incidents and/or locations, or other travel-related-information, received from Traffic Data Source 160, or to TRIM reporting messages generated by Traffic Message server 135 based on raw or partially processed data received from Traffic Data Source 160. In some such cases, one or more "traffic messages" are incorporated into a "traffic frame" or a "TPEG™ frame." General reference to a "traffic message" should be understood to include a traffic frame, unless the context dictates that the narrower meaning of "traffic message" is to be applied.

In general the term "TRIM" is used to refer to messages including travel-related information, such as messages received from Traffic Data Source 160, which are later manipulated by Traffic Message Server 135 to generate TRIM reporting messages, such as TPEG™ frames/messages and TPEG+ frames/messages.

Various system configurations can be used to implement the teachings set forth herein, and are not limited to the exact configurations discussed with reference to FIG. 1. For example, although at least one embodiment includes separate traffic and billing systems, similar functionality can be provided using a single, integrated system, or a system having one or more local or distributed processing, storage and communication elements. Thus, although embodiments including automation and traffic systems are primarily discussed herein, other embodiments can be implemented without the need for cooperation between separate automation and traffic systems.

In at least one embodiment, one or more of the illustrated servers and/or machines can be realized as a virtual server or machine implemented on the same hardware as another of the illustrated servers or machines. In each case, however, implementation of a server requires the use of hardware, and general reference to a "server," unless otherwise explicitly stated or required by the context, includes hardware components used to implement the server functionality. Additionally, various distributed processing techniques can be used to spread functionality of one or more of the illustrated servers across multiple different machines.

Figure 2:
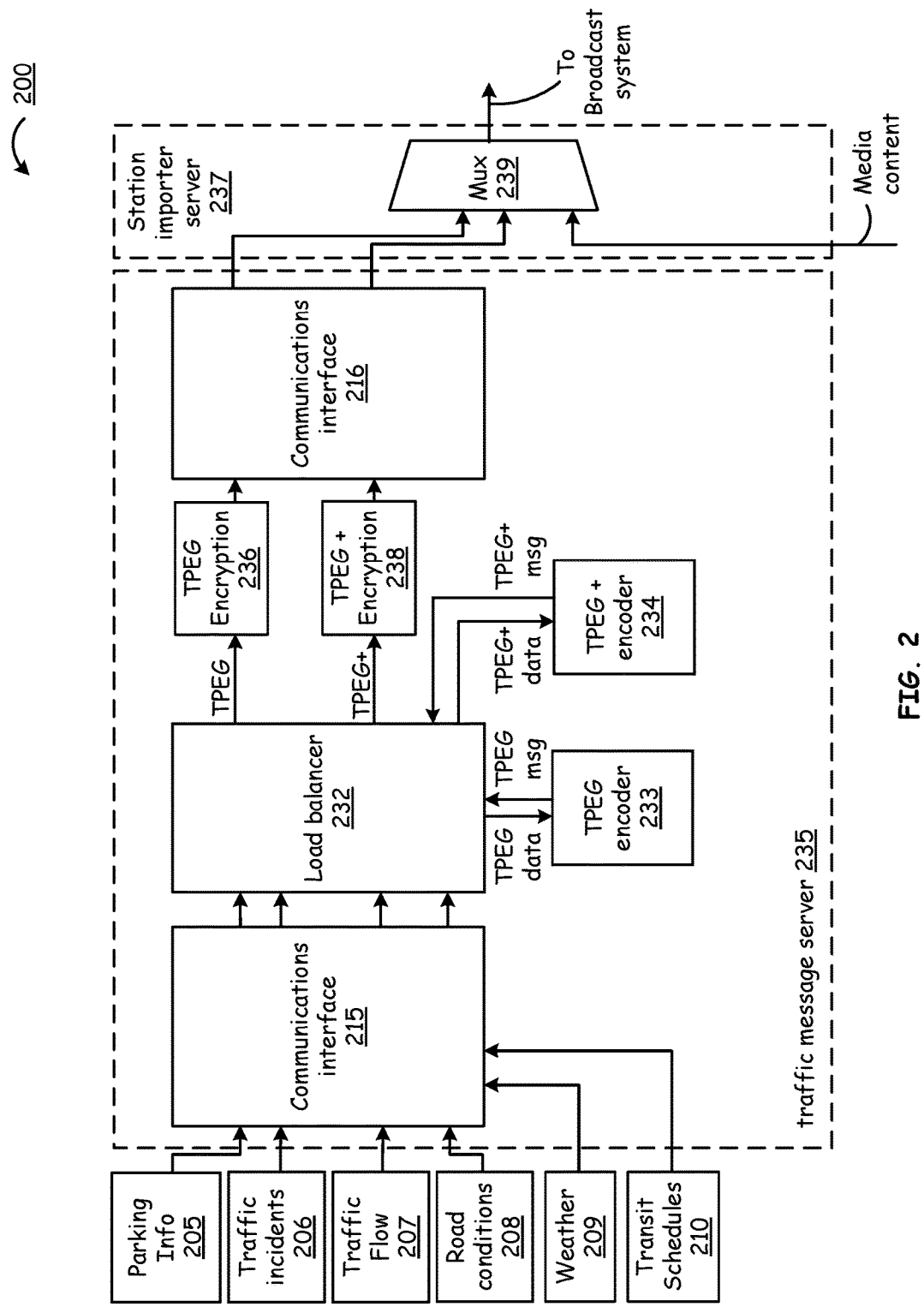
FIG. 2 is a block diagram of a traffic messaging system, in accordance with various embodiments of the present disclosure.

Referring next to FIG. 2, a traffic messaging system 200 will be discussed in accordance with various embodiments of the present disclosure. Traffic messaging system 200 includes traffic message server 235, station importer server 237, and multiple data sources including parking information source 205, traffic incidents source 206, traffic flow source 207, road conditions source 208, weather source 209, and transit schedules source 210. Any or all of these data sources can provide current, historical, and or predictive information. In other embodiments, predictive information can be generated by traffic message server 235, or obtained from a separate predictive information source (not illustrated).

Traffic message server 235 includes first communications interface 215, which receives travel-related-information messages (TRIMs) from one or more of the multiple data sources; load balancer 232 configured to group and process information included in the TRIM messages for inclusion in different TRIM reporting messages, e.g. TPEG™ and TPEG+ messages, and to provide the data to the appropriate encoder; TRIM reporting message encoders, for example TPEG™ encoder 233 and TPEG+ encoder 234, to generate the TRIM reporting messages, e.g. TPEG™ and TPEG+ messages, from information provided by load balancer 232; TRIM reporting message encryption modules, such as TPEG™ encryption module 236 and TPEG+ encryption module 238, which can encrypt the TRIM reporting messages using different keys; and second communications interface 216, which transmits the encrypted TRIM response messages to station importer server 237.

Station importer server 237 includes multiplexer 239, which multiplexes the TRIM reporting messages with media content, for example from a media automation system such as media automation system 110 (FIG. 1), and delivers the multiplexed content to a broadcast system for eventual broadcast or streaming transmission to end user devices.

Traffic message server 235 can receive travel-related information from one or more different sources. In various embodiments, the travel-related information is included in travel-related information messages (TRIMs) associated with a particular geographic location, roadway and/or transit mode (e.g. bus, plane, railway, taxi, ride-sharing service). For example, a TRIM received from weather source 209 can include information specifying the location of a weather event, information identifying roadways affected by the weather event, information identifying transit modes affected by the weather event, information specifying estimated traffic delays on the identified roadways, information specifying road condition changes for particular roadways (e.g. dry, slick, flooded, wet), or the like. As another example, a TRIM received from traffic incidents source 206 can specify a general location of a traffic incident (e.g. between exit 26 and 27 on Interstate Highway 10 in El Paso, Tex.), along with different levels of granular information identifying whether the incident is on the Eastbound or Westbound side of the highway, the lanes blocked by the incident, the stage of the incident (e.g. newly reported, responders on scene, clearing, recently cleared), or the like.

In various embodiments the TRIM received at traffic message server 235 can comply with a TPEG™ or other message format. A single TRIM can include one or more pieces of information about a single roadway, location or event. In other instances, a single TRIM can include one or more pieces of information about multiple roadways, locations, or events. Regardless of the format of the TRIMs received by traffic message server 235, load balancer 232 packages, processes, and formats appropriate information included in the TRIMS into one or more TRIM response messages that are eventually delivered to end users.

In at least one embodiment, load balancer 232 determines the volume, of information being received from one or more of the travel-related-information sources 205-210. This can include determining the number of TRIMs received from particular sources over a particular period of time, and/or determining an aggregate number of TRIMs received from two or more travel-related-information sources. Load balancer 232 can also determine a number of discrete data items included in the TRIMs, determine the size of the data in the TRIMs, regardless of the number of discrete data items in a particular TRIM, or otherwise determine the volume of incoming data to be reported to end user's head devices. Any or all of the volume of data, the number of data items, the number of TRIMs, and other similar information can be used by load balancer 232 to separate the incoming data into at least two different groups.

The first group of data, referred to for ease of reference herein as TPEG™ data, can be collected in a first queue, list, database, or other data structure or portion thereof and stored in volatile or non-volatile memory. The second group of data, referred to for ease of reference herein as TPEG+ data, can also be collected in a second queue, list, database, or other data structure or portion thereof and stored in the same memory used for storing TPEG™ data, or stored in a different memory. It should be noted that the terms TPEG™ and TPEG+ are used to provide a contextual reference that may make it easier to understand the concepts described herein. And while various embodiments can be constructed to comply, generally, with the TPEG™ standard, implementations that may not comply with the TPEG™ standard are also contemplated.

Load balancer 232 can determine which travel-related information to put in the first group (TPEG™ data) based, at least in part, on data or message size limitations associated with end user devices, and/or using other criteria. For example, a TRIM threshold can be used, where the TRIM threshold designates a maximum number of TRIMs to be included in TRIM reporting messages generated from the first group (TPEG™ data). In some embodiments employing a TRIM threshold, load balancer 232 can place information from TRIMs into the first group (TPEG™ data), beginning with data related to the largest roadways, and proceeding to insert information from TRIMs related to smaller and smaller roadways until all of the TRIMs are inserted into the first group, or until the TRIM threshold is reached. Any remaining information can then be placed in the second group (TPEG+) of information.

In other implementations employing a TRIM threshold, load balancer 232 can limit the data placed into the first group based on road classification, so that only information from TRIMs related to particular road classifications is eligible for inclusion in the first group (TPEG™ data). For example, load balancer 232 can be programmed to limit information in the TPEG™ data to information related to road classifications 0-3, and any roads having a classification indicating smaller roads, e.g. road classifications 4-7 are not included in the TPEG™ data, even if known data and message size constraints indicate sufficient capacity for additional data. The extra data, e.g. from road classifications 4-7 in this example, can be included the TPEG+ data.

In yet other embodiments, load balancer 232 can place travel-related information of certain types in the first group (TPEG™ data), and travel-related information of other types in the second group (TPEG+ data). In some such embodiments, load balancer 232 can be used to dynamically adjust the types of data included in either the first or second group based on the quantity of information received in TRIM messages, the size of TRIM reporting messages, preferences provided by market participants, including broadcasters in particular markets, device manufacturers having equipment in particular market areas, or the like. In at least some embodiments, the data placed into first or second group can be dynamically adjusted, for example to account for size limitations placed on TRIM reporting messages.

Recall that data placed in the first and second groups can be included in different TRIM reporting messages, e.g. TPEG™ or TPEG+ messages. In some embodiments, placement of information from TRIMs into designated groups allows a "preliminary" TRIM reporting message to be constructed and evaluated against message size constraints. Thus, for example, consider the case where it is desired to include basic predictive traffic information related to road classes 0-4 in TPEG™ messages, and to place at least basic predictive traffic information in TPEG+ messages. The basic predictive traffic information for road classes 0-4 can be placed in the first group of data, and a preliminary TRIM reporting message can be generated. The size of the preliminary TRIM reporting message can be tested against various size thresholds to determine whether the preliminary TRIM message is too large. If the size of the preliminary TRIM message exceeds the threshold limitations, some of the basic predictive information, for example for road class 4, can be moved to the second group of data for inclusion in the TPEG+ message, leaving basic predictive information for road classes 0-3 in the TPEG™ message. Generation and testing of preliminary messages can continue until the amount of data left in the first group can be included in a TRIM reporting message (a TPEG™ message) that satisfies message size constraints associated with an area in which the TPEG™ message is to be delivered.

The amount and type of data to be removed from the first group of data in each iteration of the preliminary TRIM reporting message testing can be based on a measured difference in size between a maximum message size and a preliminary TRIM reporting message. In other embodiments, a given amount of data can be removed at each iteration. The given amount can be a constant amount, or can be determined as a function of the iteration number. For example, the amount of data to be removed can be X on the first iteration, Y on the second iteration, and so on.

In some embodiments, a particular type of data can be removed on each iteration, in some cases without measuring the amount of data of that particular type. For example, if it is desired in a particular market to include granular data indicating traffic flow in particular lanes in a TPEG™ message, but the size of the preliminary TPEG™ message exceeds the maximum allowable TRIM reporting message size for TPEG™ messages in that particular market, the granular traffic flow data can be removed on the first iteration. If the next preliminary TPEG™ message is still too large, all predictive information could be removed, followed by removing information for smaller road classes, and so on until a preliminary TRIM reporting message (TPEG™) reaches an acceptable size. It should be noted that a threshold size for TPEG™ messages may not apply to TPEG+ messages, and that TPEG™ and TPEG+ messages may have different size thresholds.

In various embodiments, iterative checks for compliance with a size threshold are performed after message compression. In some such embodiments, knowledge of the final, compressed size of the message may not be known until after the compression is performed. For example, due to the way in which various compression techniques operate, different files may be able to compress more efficiently than other files. Thus, the compressed file size of one file may be larger than the compressed size of another file, even if both files have the same original size.

In various implementation, load balancer 232 transmits information sorted into the first group (TPEG™ data) to TPEG™ encoder 233 to generate either or both preliminary and final TRIM reporting messages compliant with a TPEG™ or other standard. Load balancer 232 can transmit information sorted into the second group (TPEG+ data) to TPEG+ encoder to generate either or both preliminary and final TRIM reporting messages for delivery via a TPEG+ message format.

After load balancer 232 has finalized the TPEG™ and TPEG+ TRIM reporting messages, the two messages can be sent to their respective encryption modules: TPEG™ encryption module 236 and TPEG+ encryption module 238. TPEG™ encryption module 236 can encrypt the finalized TPEG™ message, which is one of the two TRIM reporting messages in this example, and TPEG+ encryption module 238 can encrypt the finalized TPEG+ message, which is the second TRIM reporting messages in this example. In various embodiments, the TPEG™ encryption module 236 and TPEG+ encryption module 238 encrypt their respective messages using different hashes, different keys, or the like. Using separate encryption for TPEG™ and TPEG+ messages can be used to ensure that end-user devices properly access only TRIM reporting messages those devices are capable of properly processing.

In addition to using different encryption hashes or keys, the TPEG™ and TPEG+ messages can be transmitted using different ports. The use of different ports for TPEG™ and TPEG+ messages can also be used to ensure that end-user devices, for example legacy TPEG™ head units, process only TRIM reporting messages those units are equipped to handle. In effect, non-legacy head units can receive and decrypt either or both TPEG™ and TPEG+ messages, while legacy units simply ignore the TPEG+ messages and process the TPEG™ messages.

The TPEG™ and TPEG+ TRIM reporting messages can be delivered by second communications interface 216 to station importer server 237, which uses multiplexer 239 to insert the TRIM reporting messages with media content. the multiplexed content can be transmitted from station importer server 237 to a broadcast system for over-the-air or streaming delivery to end-user devices.

Figure 3:
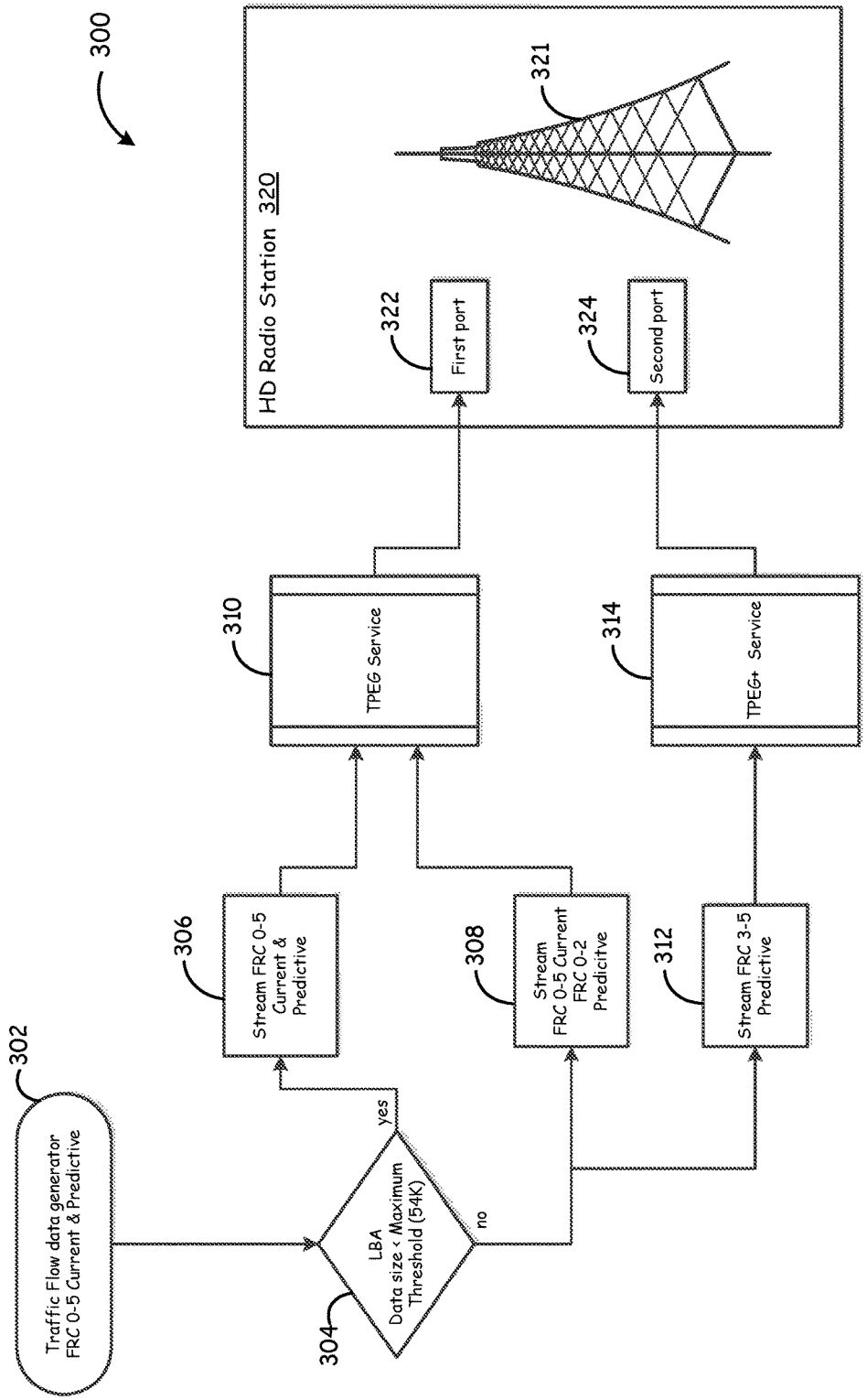
FIG. 3 is a flow diagram illustrating a process that divides traffic and other travel-related information between TPEG™ and TPEG+ messages, in accordance with various embodiments of the present disclosure.

Referring next to FIG. 3 an information flow diagram illustrating a high-level process 300, which divides traffic and other travel-related information between TPEG™ and TPEG+ messages, will be discussed in accordance with various embodiments of the present disclosure. The discussion of FIG. 3 uses the term TPEG™ as a shorthand reference to TRIM reporting messages conforming to current TPEG™ or other traffic message formats having particular data or message size limitations, and TPEG+ as a shorthand reference to TRIM reporting messages that are larger than the TPEG™ messages to take advantage of less onerous data and message size restrictions imposed by newer head unit hardware. Both TPEG™ and TPEG+ messages can be used to deliver traffic and other travel-related information via in-band on-channel (IBOC) broadcasts such as those used in HD™ radio.

As illustrated at block 302, a traffic flow generator determines current and predictive flow information for road classes 0-5. The traffic flow generator can be part of traffic Data Source 160 (FIG. 1), part of a traffic message server 135 (FIG. 1), or part of media automation system 110 (FIG. 1). As illustrated by block 304, the current and predictive information related to road classes 0-5 is checked by a load balancer to determine if the total amount of data is less than a threshold level. In at least one embodiment, this threshold level can be set to between about 45 KB-60 KB, while in some embodiments the threshold level be set to about 3,000 messages. If it is determined at block 304 that the size of the current and predictive data is less than the maximum allowed threshold, both the current and predictive data for road classes 0-5 is streamed to a TPEG™ service 310, as illustrated by block 306. TPEG™ service 310 can generate a TPEG™ reporting message and deliver the TPEG™ reporting message to HD™ radio station 320 for broadcast to end users via tower 321. End user devices can receive the TPEG™ reporting message over first port 322.

If it is determined at block 304 that the size of the current and predictive data exceeds the maximum allowed threshold, the current data for road classes 0-5 and a portion of the predictive data, for example predictive data for road classes 0-2, can be delivered to TPEG™ service 310, as illustrated by blocks 306 and 308. TPEG™ service 310 can use this information to generate a TPEG™ reporting message and deliver the TPEG™ reporting message to HD™ radio station 320 for broadcast to end users via tower 321. Some of the predictive data, for example the predictive data for road classes 3-5, can be delivered to TPEG+ service 314, as illustrated by block 312. TPEG+ service 314 can generate can generate a TPEG+ reporting message and deliver the TPEG+ reporting message to HD™ radio station 320 for eventual broadcast to end users via tower 321. End user devices can receive the TPEG+ reporting message over second port 324.

Figure 4A:
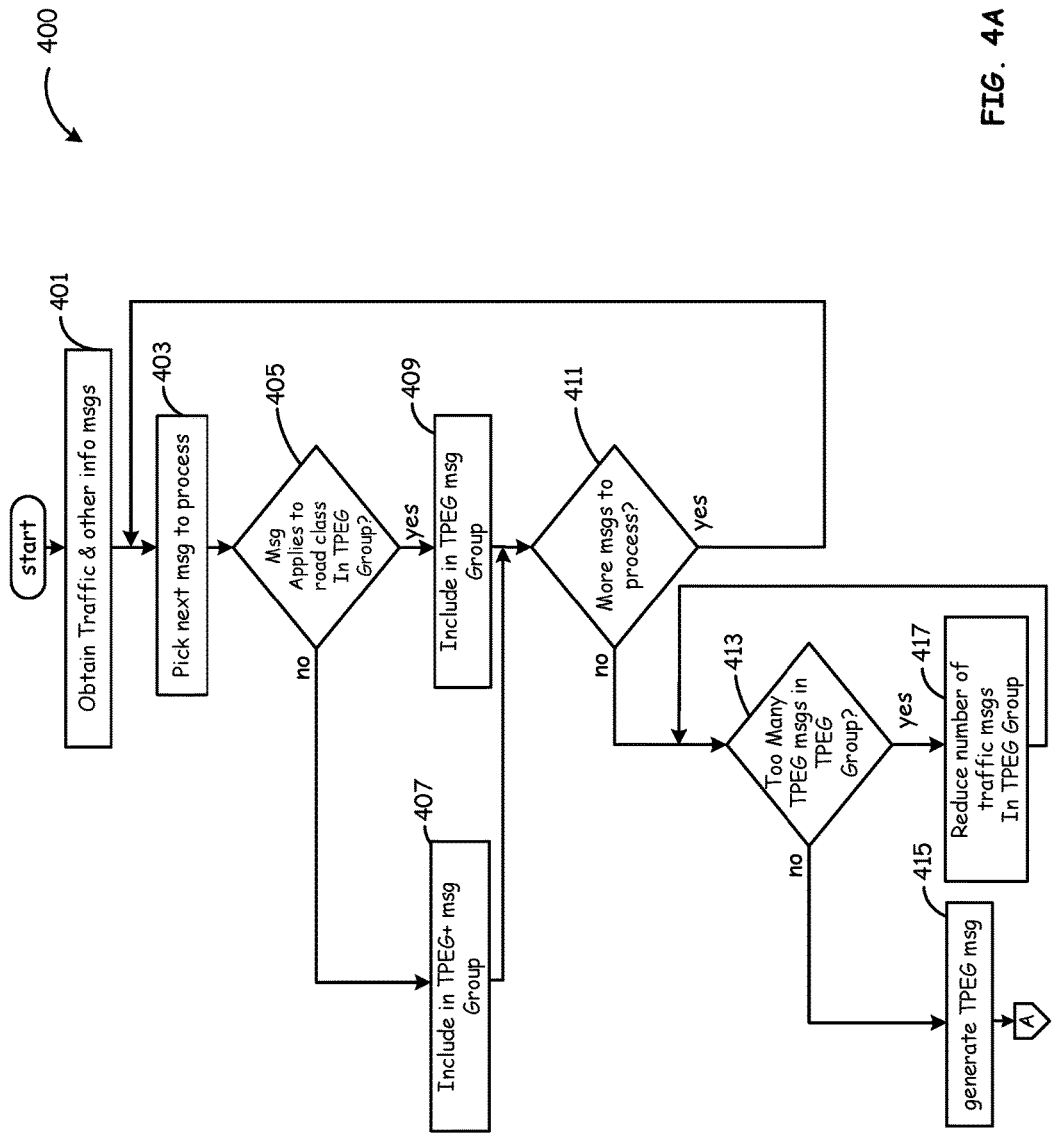
FIGS. 4A and 4B are flowcharts illustrating a method of balancing placement of information included in incoming travel-related-information (TRIM) messages between multiple different TRIM reporting messages provided to end users, in accordance with various embodiments of the present disclosure.
Figure 4B:
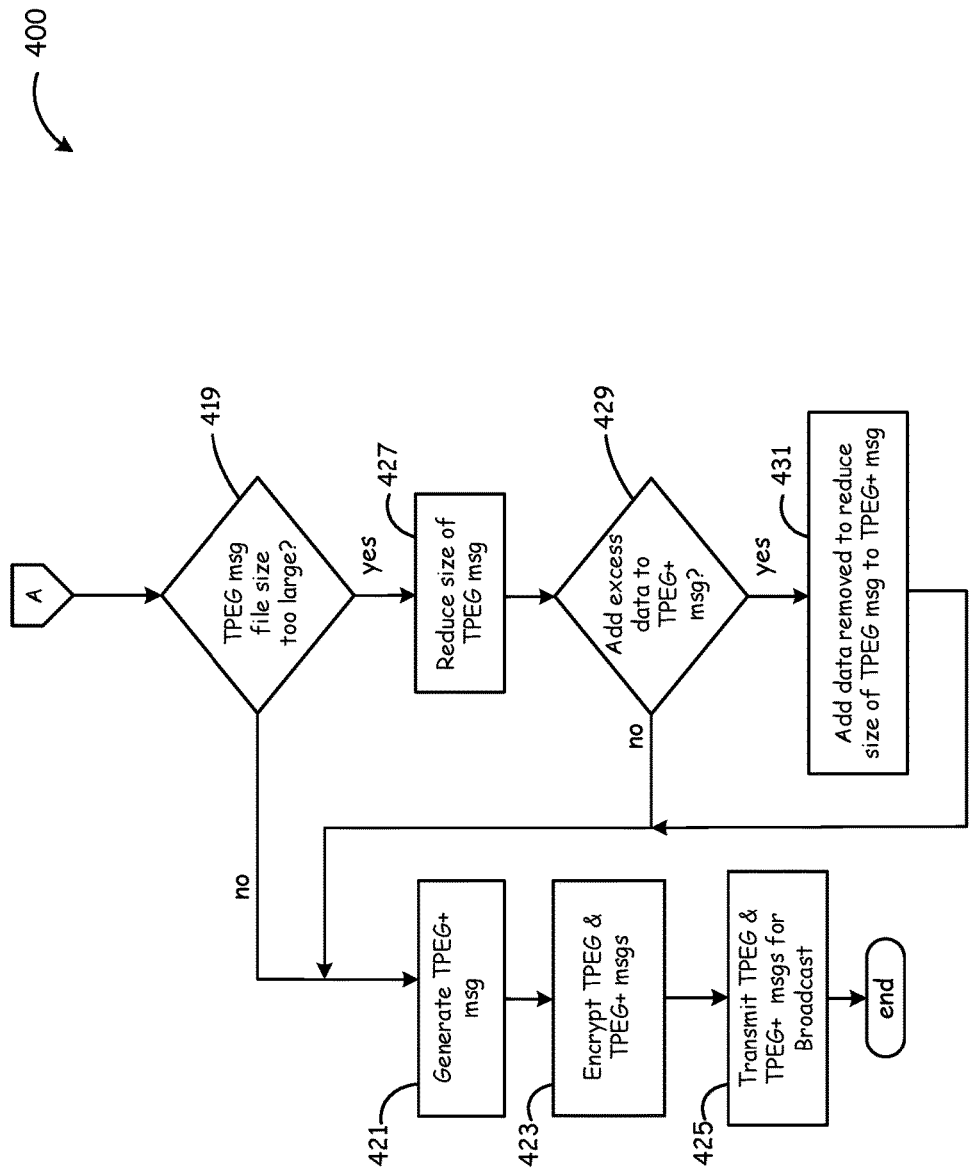

Referring next to FIGS. 4A and 4B, a method 400 of balancing placement of information included in incoming travel-related-information (TRIM) messages between multiple different TRIM reporting messages will be discussed in accordance with various embodiments of the present disclosure.

As illustrated by block 401, TRIM messages including traffic and other travel-related information can be received at a traffic message server 135 (FIG. 1). As illustrated by block 403, a next message to process is selected. In at least one embodiment, message processing can begin with receipt of a first message, without requiring previous receipt of all messages to be processed for a particular time frame. In other embodiments, processing of any message is delayed until all messages for a particular time period are received.

As illustrated by block 405, a check is made to determine whether the message applies to a road class to be included in a TPEG™ TRIM reporting message. If the road class is to be included in a TPEG™ message, for example by default or according to a market-area preference, information from the message being processed is placed in the TPEG™ message group, as illustrated by block 409. If the information in the message being processed is not to be included in the TPEG™ message group, the information from the message can be put in the TPEG+ message group, as illustrated by block 407.

As illustrated by block 411, a check is made to determine whether there are more messages to process. The check can include determining whether an additional message has been received during a predetermined time period, whether a queue containing TRIM messages is empty, whether any remaining unprocessed TRIM messages are stale, or expired, or the like. If there are more messages to process, the next message to process is selected, as illustrated at block 405.

If there are not more messages to process, a check can be made at block 413 to determine whether a threshold number of messages in the TPEG™ group has been exceeded. For example, in at least one embodiment, information to be included in a TRIM reporting message is limited to a predetermined maximum number of TRIMs. If it is determined at block 413 that the threshold number of TRIMs has not been exceeded, a TPEG™ message, sometimes referred to herein as a preliminary TPEG™ message, is generated as illustrated by block 415. If, however, it is determined at block 413 that there are too many messages, the number of traffic messages in the TPEG™ group is reduced, as illustrated by block 417.

After generation of the preliminary TPEG™ message, a check is made at block 419 to determine whether the size of the preliminary TPEG™ message is too large. The check can be made by comparing a size of the TPEG™ message to a TPEG™ threshold size limit. If the TPEG™ message does not exceed the threshold size limit, the preliminary TPEG™ message becomes a finalized TPEG™ message, and a TPEG+ message is generated at illustrated by block 421. Note that in at least one embodiment, the TPEG+ message is not generated until the TPEG™ message is finalized.

As illustrated by block 427, if the TPEG™ message size is too large, the size of the TPEG™ message can be reduced. In various embodiments, reduction of the TPEG™ message size includes, but is not limited to: removing particular road classes from the TPEG™ message; removing particular data types, e.g. predictive, current, weather, lane-specific information, or the like, from the TPEG™ message; decreasing a bounding box size associated with a particular road classification or data type and removing road segments outside of the newly decreased boundaries from the TPEG™ message; removing a combination of these items from the TPEG™ message.

As illustrated by block 429, a decision is made regarding whether excess data is to be added to the TPEG+ message. In at least some embodiments, the excess data can include some or all of the data removed from the TPEG™ message. If the excess data is not to be moved to the TPEG+ message, method 400 proceeds to block 421, where a TPEG+ message is generated. If the excess data is to be added to the TPEG+ message, some or all of the data removed from the TPEG™ message is moved to the TPEG+ message, and the method again proceeds to block 421.

As illustrated by block 423, the TPEG™ and TPEG+ messages are encrypted. In at least one embodiment, the TPEG™ and TPEG+ messages, collectively the TRIM reporting messages, are each encrypted using different hash functions, different keys, etc. As illustrated by block 425 the TRIM reporting messages are transmitted for broadcast, e.g. via in-band-on-channel (IBOC) broadcasting such as that used in HD™ radio, and/or streaming, to end-user devices. TPEG™ and TPEG+ message can each be transmitted using different ports. Note that the terms TPEG™ message and TPEG+ message are used herein to refer to reporting messages generated for delivery to end users, unless the context requires otherwise.

Figure 5:
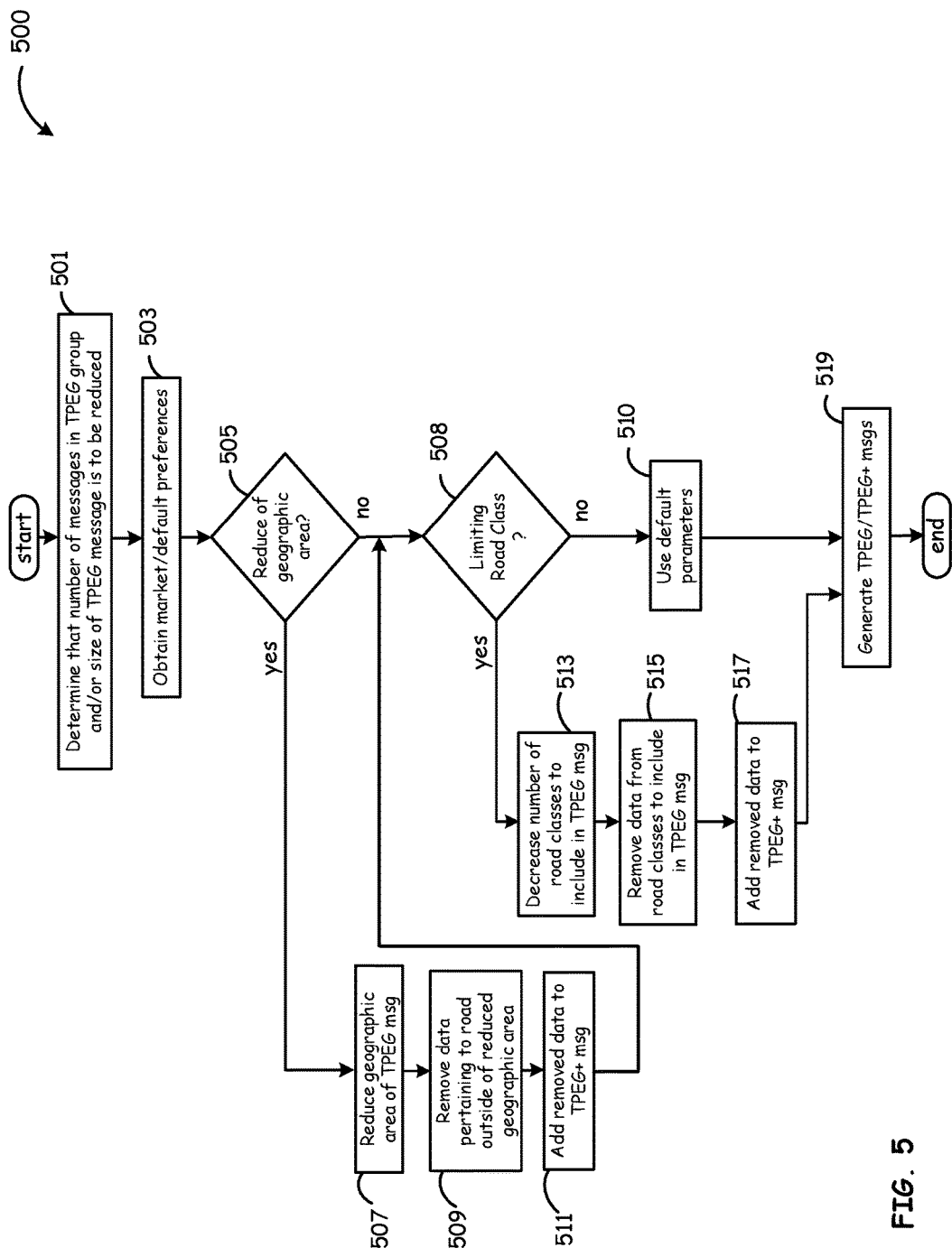
FIG. 5 is a flowchart illustrating a method of selecting excess information to be removed from a first travel-related-information (TRIM) reporting message, and inserted into an alternate TRIM reporting message, in accordance with various embodiments of the present disclosure.

Referring next to FIG. 5, a method 500 of selecting excess information to be removed from a first travel-related-information (TRIM) reporting message (TPEG™), and inserted into an alternate TRIM reporting message (TPEG+), will be discussed in accordance with various embodiments of the present disclosure. In various embodiments, the contents of TPEG™ and TPEG+ TRIM reporting messages can be dynamically modified, split, or balanced. Dynamic modification of information included in multiple different TRIM reporting messages can be used in some implementations to ensure that legacy TPEG™ devices, e.g. head devices having data or message size limitations, can continue to receive at least usual traffic and other travel-related content, while at the same time allowing enhanced delivery of additional traffic and other travel-related information to more capable head unit devices having less restrictive data or message size limitations.

As illustrated by block 501, method 500 begins at a point where a determination has already been made that the number of messages in the TPEG™ TRIM reporting message, or the size of the TPEG™ TRIM reporting message, is to be reduced. As illustrated at block 503, default and/or market preferences related to TPEG™ message size and content can be obtained. These preferences can include, for example, preferred road classifications to include in the TPEG™ message, preferred types of information, e.g. traffic predictions, lane-specific incident information, travel-related weather information, road conditions, or the like. The preferences can also include rankings and/or ordering preferences relating to which information is more desirable, and other information that can be used to aid in selecting information to be moved out of a TPEG™ TRIM reporting message and into a TPEG+ TRIM reporting message. In some cases, market or default preferences can specify a first preference for one TPEG™ reporting period, and a different preference for a subsequent reporting period.

In various implementations, market areas correspond to a geographic area or region that includes a particular set of roads and road segments. As an extreme example, portions of Interstate Highway 10 can be relevant to market areas in Texas, California, or Florida, but an accident in Florida will not be important to report in a TRIM reporting message broadcast in California. Thus, travel related information for any particular market area is often confined to a limited geographic area. As illustrated by block 505, a check can be made to determine whether a load-balancing preference for a particular market specifies reduction of a geographic area.

It should be noted that in at least one embodiment, it may be desirable to avoid the situation in which a user of a legacy device receives travel information during non-rush hour periods, but that travel information "disappears" during peak or rush-hour traffic. In some such embodiments, a static geographic coverage area can be used, while reducing the amount of predictive traffic information that is included in the TRIM reporting messages. For example, predictive information can be reduced from +60 minute predictions, to +45 minute or +30 minute predictions, or the like.

If a preference for reduction of the geographic area is indicated at block 505, the geographic area can be reduced, so that fewer road segments are included in the TPEG™ message, as illustrated by block 507. Reducing the geographic area can include uniformly reducing a geographic area boundary in some implementations. In other instances, reducing the geographic area may include removal of one or more suburbs, towns, subdivisions, or geopolitical areas from the geographic area, so that boundaries of the geographic areas may be reduced in a non-uniform manner. For example, two metropolitan market areas may include a large city, and various smaller cities or towns. One market area may prefer an overall uniform reduction of the geographic area, as measured from the city center, while another market area may prefer removal of one or more relatively low density towns that, while still within the metropolitan area, are not deemed to be a high priority.

As illustrated at block 509, some or all data pertaining to roads outside of the reduced geographic area can be removed from a collection of data to be included in a TPEG™ TRIM reporting message and added to a TPEG+ TRIM reporting message as illustrated by block 511, thereby reducing the size or number of messages included in a TPEG™ TRIM reporting message transmitted to end-user devices. In some embodiments, even though a particular roadway segment may have been excluded from the geographic area, large incidents and extensive delays in excluded geographic areas can still be reported in the TPEG™ message. Note that reducing a geographic area can be a temporary measure, and the original geographic area can be restored for following TPEG™ messages, unless reduction of the geographic area again becomes necessary. In some cases, the original geographic area can be restored after a predetermined time period, for example after rush hour is over.

As illustrated by block 508, a check is made to determine whether TPEG™ TRIM reporting messages in a particular market are to be limited by reducing the number of road classes. If not, default, or fallback parameters can be used, as illustrated by block 510. However, as illustrated by block 513, if the market preferences indicate that the size of the TPEG™ TRIM reporting message is to be reduced by limiting the road classes included in the TPEG™ TRIM reporting message, the number of road classes included in the TPEG™ message can be reduced. Generally, decreasing the number of road classes included in the TPEG™ message results in removal of road classes associated with smaller roads, but other reduction schemes could be used consistent with the present disclosure.

As illustrated by blocks 515 and 517, road classes can be removed from the TPEG™ message, and moved into the TPEG+ message, so that data is effectively shifted from TPEG™ to TPEG+. In some embodiments, a TPEG+ message may already include all data in the TPEG™ message, plus additional content. In some such embodiments, there is no need to add removed data to the TPEG+ message, because it is already there. As illustrated at block 519, the TPEG™ and TPEG+ TRIM reporting messages can be generated, and delivered for broadcast and/or streaming to end-user devices.

Various techniques can also be used in combination, so that information about different road portions is removed at different times. For example, a market preference can indicate that the first time a geographic area is to be reduced, a Northern portion of the geographic area can be removed, and the next time the geographic area needs to be reduced, a Western portion of the geographic area can be removed. Additionally, market preferences can indicate reduction of a geographic area one time, and limiting road classes without reduction of the geographic area the next.

Figure 6:
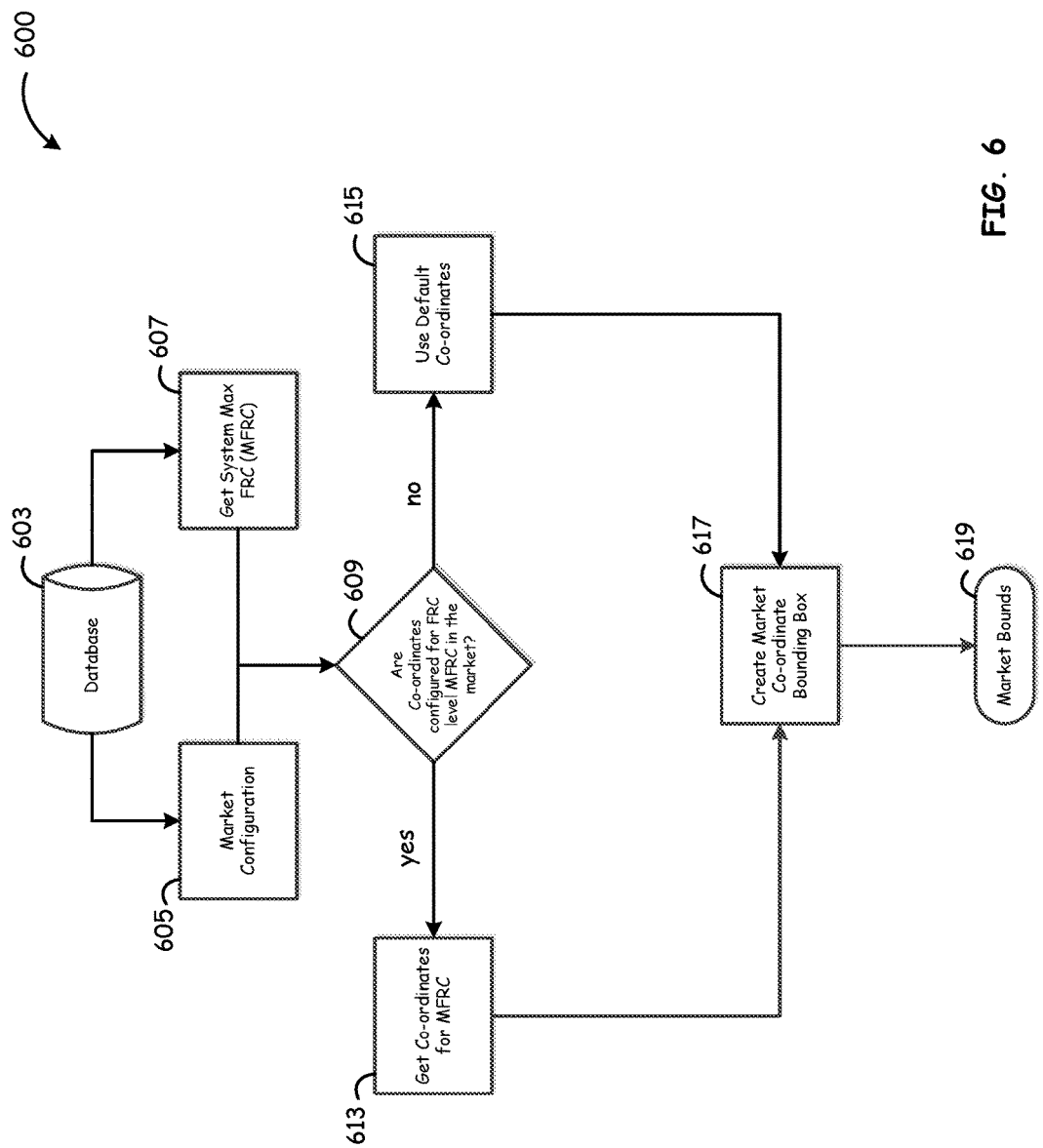
FIG. 6 is a flow diagram illustrating determination of a market-level bounding area to be used in conjunction with road classifications to determine which travel information to provide in TPEG™ and TPEG+ messages, in accordance with various embodiments of the present disclosure.

Referring next to FIG. 6, a method 600 of determining a market-level bounding area used in conjunction with road classifications to determine which travel information to provide in TPEG™ and TPEG+ messages will be discussed in accordance with various embodiments of the present disclosure. As illustrated by blocks 605 and 607, information about a maximum functional road class (MFRC) and various market configuration parameters, can be obtained from storage in database 603.

The MFRC obtained at block 607 can be used to designate a maximum road class (e.g. a smallest size road) for which travel-related information reporting messages should be broadcast. The MFRC setting can be determined and applied based on "standard" or "default" boundaries for each market.

The market configuration parameters can be used to allow market-level customization of boundary areas, and in at least one embodiment include market-specific boundary coordinates associated with particular road classes. The market configuration parameters can alternatively include a null value or other indication that market-specific boundary coordinates are not to be used.

In at least some embodiments, the customized boundary configurations can be determined using various "bounding boxes" defined by latitude and longitude coordinates, as specified by the market configuration parameters. While many markets use the same boundary coordinates (default boundary coordinates) for all road classes, some larger markets, for example New York City, might exceed a maximum TPEG™ packet size or message count if the default bounding box were used for all road classes. In some embodiments, therefore, the default bounding box (defining the entire market area coverage) can be used for larger roads, e.g. FRC 0-2, a smaller bounding box can be used for smaller roads, e.g. FRC 3, and an even smaller bounding box can be used for FRC 4-5.

As illustrated by block 609, a check can be made to determine whether the market configuration parameters obtained at block 605 indicate market specific bounding coordinates are to be used. As illustrated by block 615, if the result of the block 609 is "no," then default coordinates can be used. However, as illustrated by block 613, if the result of block 609 is "yes," the market specific coordinates for each road class in the MFRC can be obtained.

As illustrated by blocks 617 and 619, one or more bounding boxes associated with one or more functional road classes can be generated. The boundary coordinates used to define the bounding boxes can be used to define a single default bounding box, which corresponding to the overall market geographic area, for all road classes in the MFRC. Alternatively, the coordinates used to define the bounding boxes can be used to define multiple different bounding boxes for different road classes in the MFRC.

Figure 7:
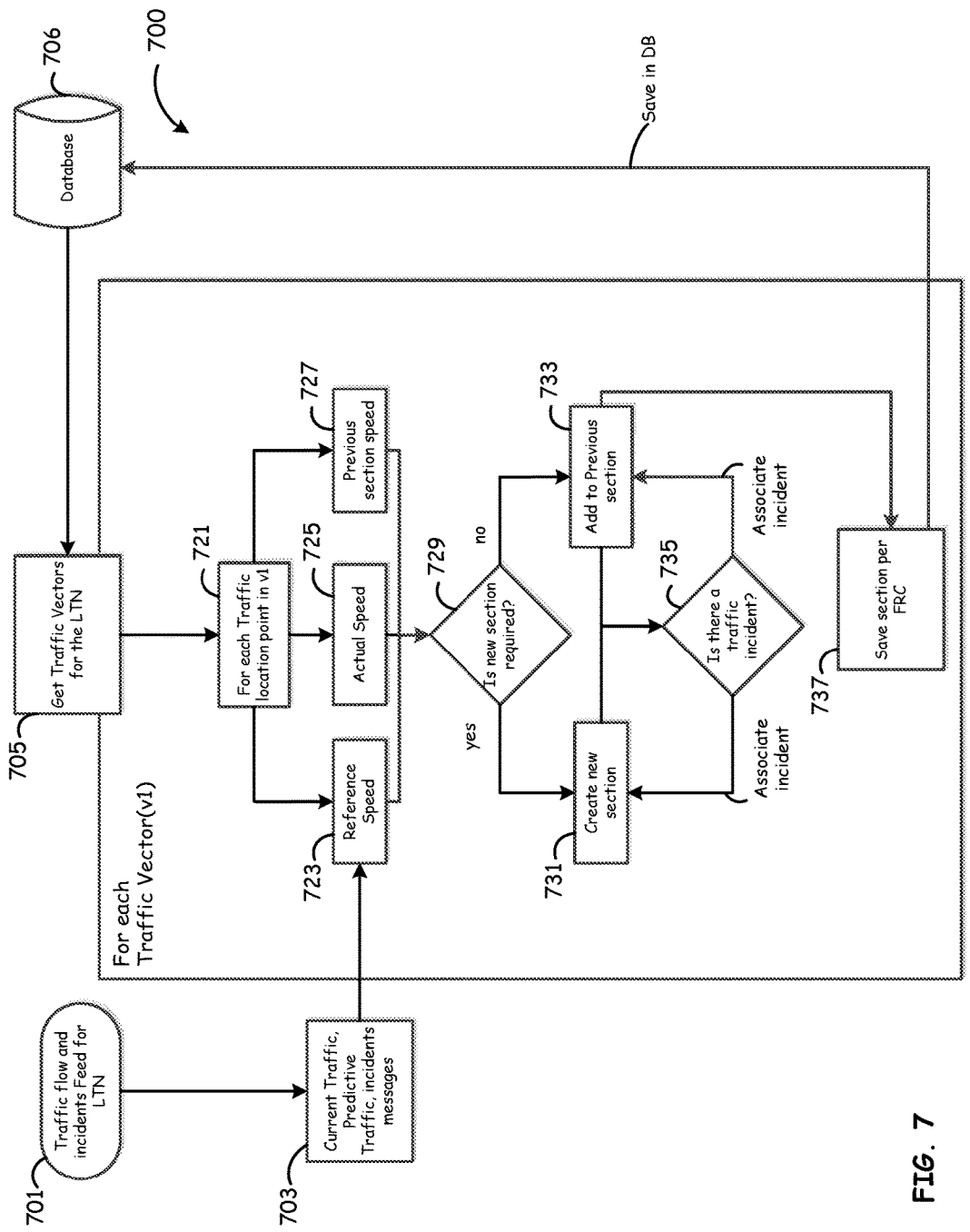
FIG. 7 is a flow diagram illustrating a method of creating TPEG™ traffic messages in accordance with various embodiments of the present disclosure.

Referring next to FIG. 7, a method 700 of creating TPEG™ traffic messages, sometimes referred to as TPEG™ flow data, will be discussed in accordance with various embodiments of the present disclosure. As illustrated by block 701, information about traffic flow and incidents can be obtained for particular location table numbers (LTNs). In at least one embodiment, a location table number (LTN) is an entry in a location table that identifies a particular section of roadway, for example using start and end points, an intersection within a particular market area, or the like. Traffic flow and incidents can be linked to a particular LTN so that the location associated with the information can be identified. For example, where an LTN refers to an intersection, the location of a traffic incident can be identified as LTN+0.5 to indicate that the incident is 0.5 miles after the intersection identified by that LTN in a given direction of travel, or −0.1 to indicate that the incident occurred 0.1 miles before the intersection identified by that LTN in that same direction of travel.

As illustrated by block 703, travel-related information messages (TRIMs) including information about current traffic, predictive traffic and incidents are generated from the traffic flow and incident information received at block 701. In at least some embodiments, these TRIMS are generated by a traffic Data Source 160 (FIG. 1), and provided to a traffic message server 135 (FIG. 1).

As illustrated by block 705, TPEG™ flow data vectors, sometimes referred to herein as TFP vectors, can be obtained from database 706. A TFP vector can represent a status of one or more particular road segments at a specific time, and can include one or more speeds associated with one or more road segment, both a current and predicted level traffic flow of the road segment, and similar information. For example, a TFP vector for a particular road segment can include information indicating that a current traffic flow is "slow," and a predicted traffic flow of "stop-and-go." The TFP vectors obtained at block 705 can be, in various embodiments, previous TFP vectors for particular roadways or roadway segments. The particular roadway segment with which the TFP vector applies can be determined using a location table number (LTN) with offsets, or using another suitable location identification scheme. As illustrated by method 700, the following blocks can be executed for each traffic vector obtained at block 705.

In some embodiments, a TFP vector can include multiple sub vectors associated with particular points on a road. As illustrated by block 721, for each of one or more traffic location points in a TFP vector under consideration, a reference speed can be determined as illustrated by block 723, an actual speed can be determined as illustrated by block 725, and a previous section speed can be determined as illustrated by block 727. In at least one implementation, the previous speed can be determined based on the TFP vector obtained from database 706, while the actual and reference speeds can be determined from the TRIMs obtained at block 703.

As illustrated by block 729, a decision is made regarding whether reference to an additional section of roadway is to be added to the TFP vector to report information included in the TRIMs obtained at block 703. If a new section is required, for example because a traffic incident has occurred on a portion of a roadway that was not included in the TFP vector under consideration, because market boundaries have been adjusted, or the like, reference to the new section of roadway is added to the TFP vector as illustrated by block 733, and any new traffic incident is associated with the new section of roadway, based on the decision made at block 735.

If it is determined at block 731 that there is no requirement for a new section, for example because the TRIM indicates only a change in actual speed of an already included roadway section, or because a traffic incident occurred on a section of roadway already included in the TFP vector under consideration, the already existing roadway section in the TFP vector is updated with any new information from blocks 723, 725, and 727. A new traffic incident can be associated with the roadway section already existing based on a decision made at block 735.

As illustrated by block 737, updated sections of the TFP vector are saved to database 706, and method 700 iterates until the TFP vectors are updated as required. In some embodiments, these TFP vectors can be sorted into two or more groups, as discussed herein, based on various market, system, or other requirements for road classifications and data inclusion/exclusion so that multiple TRIM reporting messages, e.g. TPEG™ and TPEG+ messages can be generated and delivered to end user devices.

Figure 8:
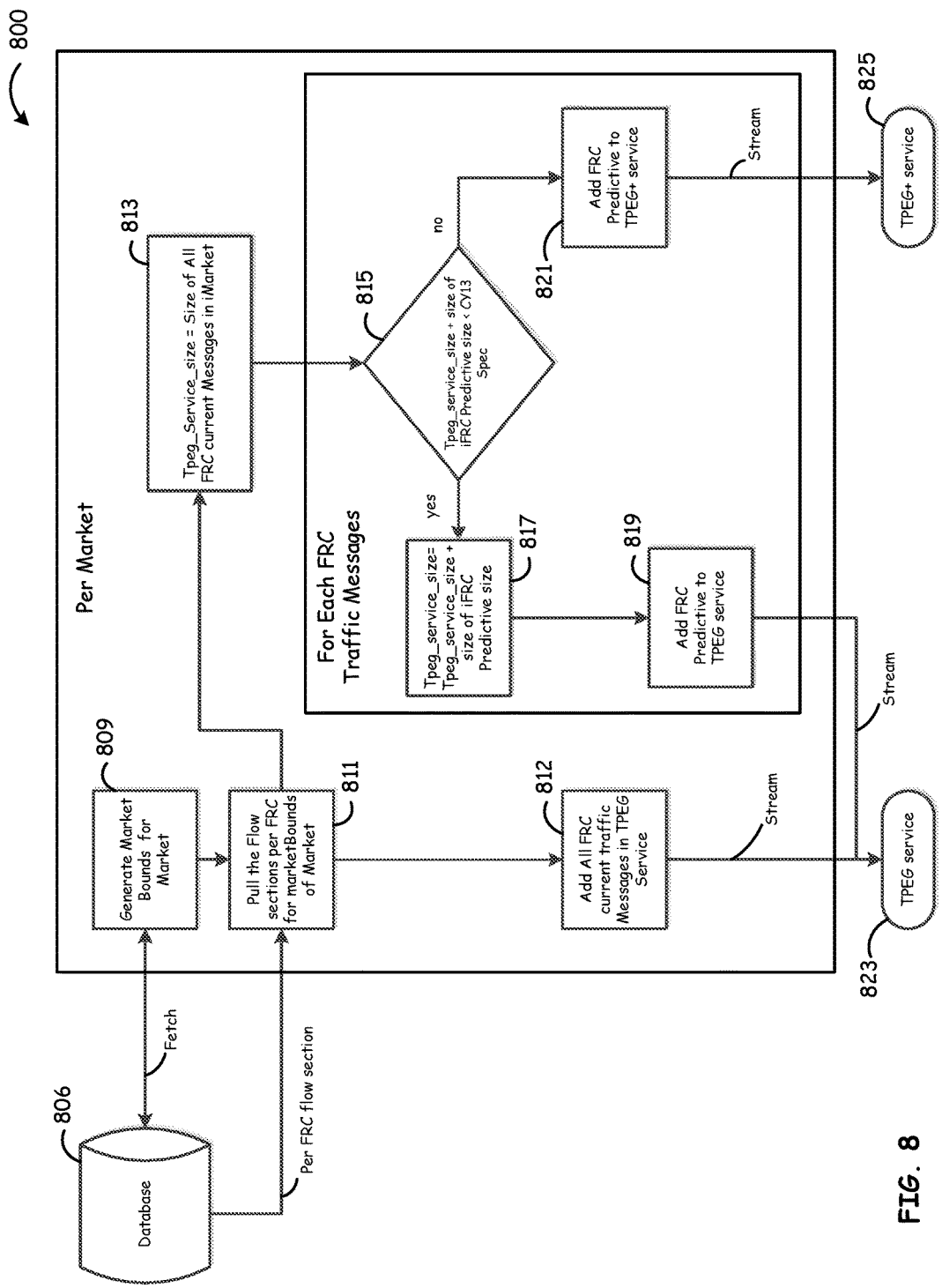
FIG. 8 is a flow diagram illustrating a load balancing method in accordance with various embodiments of the present disclosure.

Referring next to FIG. 8, a method 800 for load balancing travel-related reporting messages will be discussed in accordance with various embodiments of the present disclosure. As illustrated by block 809, market boundaries specifying the area for which travel information is to be reported are generated based on information obtained from database 806. The generation of market boundaries has been previously discussed with respect to FIG. 6.

As illustrated by block 811, information about flow sections within market bounds determined at block 809 is obtained from database 806 on a per-FRC (functional road class) basis. A flow section can include information about traffic flow along all, or a portion of, a particular route. In various embodiments, a flow section can include a portion of a single roadway, or portions of multiple roadways. In various embodiments, flow sections are obtained for substantially all portions of all roads having relevant FRCs within the market boundaries determined at block 809. As used herein, a "relevant FRC" refers to a road class that has at least a potential to be reported in a TPEG™ or TPEG+ reporting message. Thus, if it is known that roads classified with an FRC of 0-5 will be considered for inclusion in TPEG™ or TPEG+ messages, but that roads classified as FRC 6 or higher will not even be considered for inclusion, roads with a classification of FRC 6 or higher are not considered to have relevant FRCs.

In some embodiments, database 806 can store information about road sections, even if those road sections do not have relevant FRCs, while in other embodiments, database 806 does not store information for road sections having non-relevant FRCs. Furthermore, in various embodiments an FRC can be considered relevant for one time period, but not for another time period. Thus, for example, a road classified as FRC 6 may be considered irrelevant for rush hour TPEG™ and TPEG+ messages, but considered relevant for lunchtime drive TPEG™ and TPEG+ messages.

As illustrated by block 812, current traffic messages, as opposed to predictive traffic messages, can be add to the flow section information obtained at block 811, and added to a TPEG™ data group to be streamed to TPEG™ service 823. In at least one embodiment, TPEG™ service 823 can be part of traffic message server 235 (FIG. 2), while in some embodiments some or all functions of TPEG™ service 823, e.g. TPEG™ encoding and/or encryption functionality, can be performed by a third party or by another server device included in traffic messaging system 170.

As illustrated by block 813, the aggregate size of the FRC current (as opposed to predictive) messages is determined. For example, a Tpeg_Service_size variable can be set equal to the size of the messages associated with relevant FRCs. In some embodiments, the "size of the messages" refers to the size of the payload of travel-related information messages (TRIMs) received from any of various traffic data sources, from database 806, or the like. In various embodiments, for example where a single TRIM includes both current and predictive travel information, the "size of the messages" can refer to the size of the relevant portion of the message, e.g. either the current or the predictive information.

The following blocks 815, 817, 819, and 821 can be performed for each traffic message being processed. As illustrated by block 815, a check is made to determine whether the aggregate size of the FRC current messages plus the size of predictive information exceeds a threshold level. In at least one embodiment, the threshold level can be set according to a TPEG™ or similar specification, market level specification, end-user device limitations, or some combination thereof. In at least some embodiments, end-user hardware devices can be compliant with various TPEG™ or other specifications. In some implementations, end-user hardware data and/or message size limitations can be inferred based on compliance with a particular specification.

As illustrated at block 821, if the combined size of current and predictive messages is greater than or equal to the threshold level (i.e. a "no" result), the predictive information is added to a TPEG+ data group, which can be streamed to TPEG+ service 825. As illustrated at block 817, if the combined size of current and predictive messages is less than the threshold level (i.e. a "yes" result), the size the Tpeg_Service_size is increased to include the size of both the current and predictive information. As illustrated at block 819, the predictive information is streamed to the TPEG™ service 823, so that the TPEG™ reporting message will include both the current and predictive information.

Figure 9:
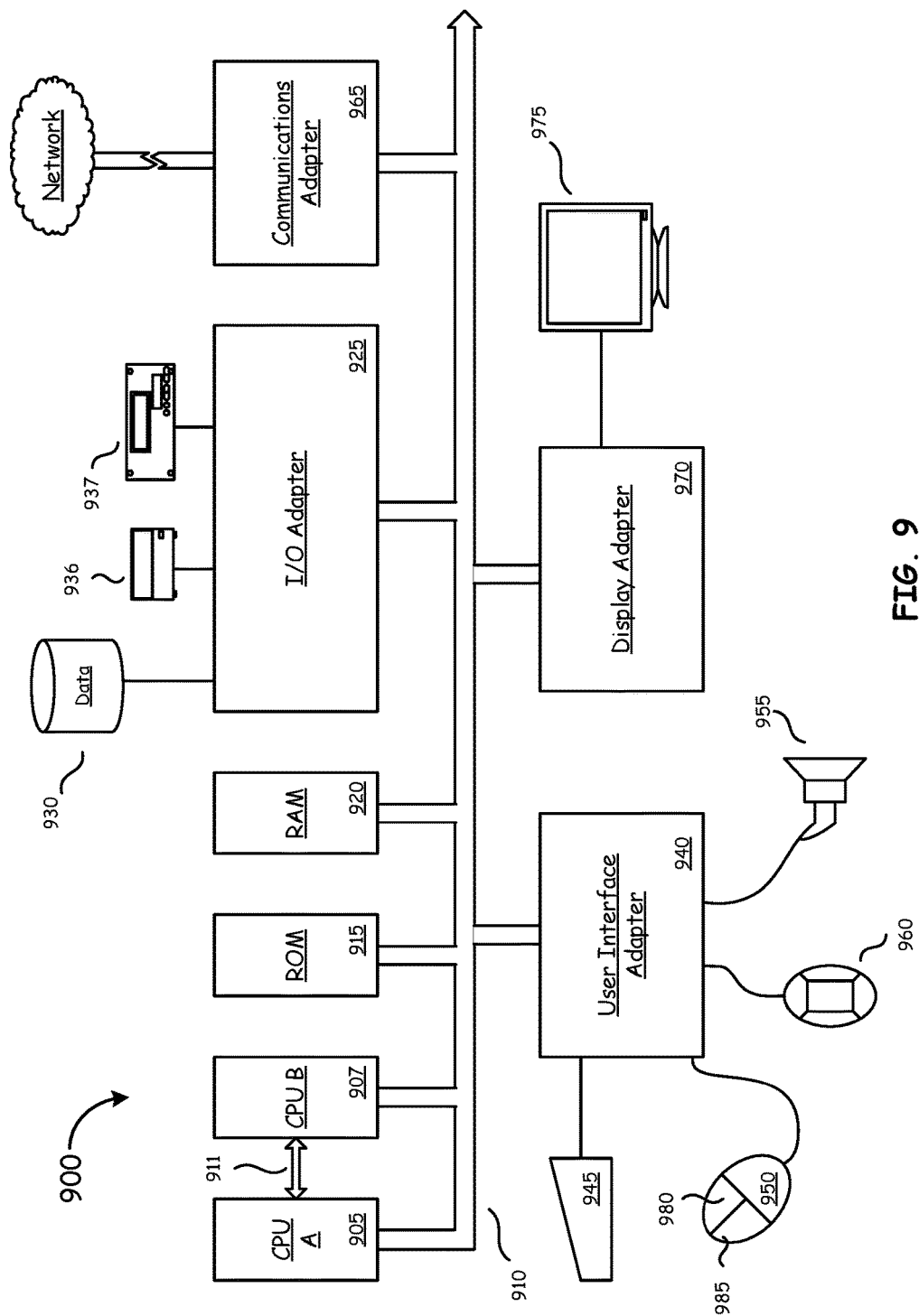
FIG. 9 is a high-level block diagram of a processing system, part or all of which can be used to implement various servers, machines, devices, and systems, in accordance with various embodiments of the present disclosure.

Referring next to FIG. 9, a high-level block diagram of a processing system 900 is illustrated and discussed. Processing system 900 includes one or more central processing units, such as CPU A 905 and CPU B 907, which may be conventional microprocessors interconnected with various other units via at least one system bus 910. CPU A 905 and CPU B 907 may be separate cores of an individual, multi-core processor, or individual processors connected via a specialized bus 911. In some embodiments, CPU A 905 or CPU B 907 may be a specialized processor, such as a graphics processor, other co-processor, or the like.

Processing system 900 includes: random access memory (RAM) 920; read-only memory (ROM) 915, wherein the ROM 915 could also be erasable programmable read-only memory (EPROM) or electrically erasable programmable read-only memory (EEPROM); input/output (I/O) adapter 925, for connecting peripheral devices such as disk units 930, optical drive 936, or tape drive 937 to system bus 910; a user interface adapter 940 for connecting keyboard 945, mouse 950, speaker 955, microphone 960, or other user interface devices to system bus 910; communications adapter 965 for connecting processing system 900 to an information network such as the Internet or any of various local area networks, wide area networks, telephone networks, or the like; and display adapter 970 for connecting system bus 910 to a display device such as monitor 975. Mouse 950 has a series of buttons 980, 985 and may be used to control a cursor shown on monitor 975.

It will be understood that processing system 900 may include other suitable data processing systems without departing from the scope of the present disclosure. For example, processing system 900 may include bulk storage and cache memories, which provide temporary storage of at least some program code in order to reduce the number of times code must be retrieved from bulk storage during execution.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A method of preparing travel related information for broadcast, the method comprising:
   receiving travel-related-information messages (TRIMs) from one or more information sources;
   adding information from at least a first TRIM to a first message group;
   adding information from at least a second TRIM to a second message group;
   determining that a size of a first TRIM reporting message generated from the first message group will exceed a permissible message size;
   removing excess information from the first message group to decrease the size of the first TRIM reporting message to the permissible message size or less;
   adding at least a portion of the excess information to the second message group;
   generating a final first TRIM reporting message from the first message group;
   generating a final second TRIM reporting message from the second message group;
   transmitting the final first TRIM reporting message for broadcast to an end-user device via a first service port; and
   transmitting the final second TRIM reporting message for broadcast to the end-user device via a second service port, different from the first service port.

2. The method of claim 1, further comprising:
   determining that a number of TRIMs including information to be added to the first message group exceeds a threshold number of TRIMs;
   removing information from at least an excess number of TRIMs from the first message group; and
   adding information from the at least an excess number of TRIMs to the second message group.

3. The method of claim 1, wherein:
   the final first TRIM reporting message is a Transport Protocol Expert Group (TPEG™) message; and
   the permissible message size is determined based on a TPEG™ message size limitation of the end-user device.

4. The method of claim 1, further comprising:
   determining, on a per-market basis, whether information from a particular TRIM is to be included in the first message group or the second message group.

5. The method of claim 1, further comprising:
   adding information from a particular TRIM to the first message group based on a type of information associated with the first message group; and
   adding information from the particular TRIM to the second message group based on a type of information associated with the second message group.

6. The method of claim 1, further comprising:
   adding information from a particular TRIM to the first message group based on a granularity of information associated with the first message group; and
   adding information from the particular TRIM to the second message group based on a granularity of information associated with the second message group.

7. The method of claim 1, further comprising:
   encrypting the final first TRIM reporting message using a first key; and
   encrypting the final second TRIM reporting message using a second key, different from the first key.

8. A device comprising:
   a processor and associated memory configured to implement a travel message server, the travel message server comprising:
   at least one interface configured to receive travel-related-information messages (TRIMs) from one or more information sources;
   a load balancer configured to:
     add information from at least a first TRIM to a first message group;
     add information from at least a second TRIM to a second message group;
     determine that a size of a first TRIM reporting message generated from the first message group will exceed a permissible message size;
     remove excess information from the first message group to decrease the size of the first TRIM reporting message to the permissible message size or less;
     add at least a portion of the excess information to the second message group;
   at least one transport protocol experts group (TPEG™) encoder configured to:
     generate a final first TRIM reporting message from the first message group;
     generate a final second TRIM reporting message from the second message group;
   the at least one interface configured to:
     transmit the final first TRIM reporting message for broadcast to an end-user device via a first service port; and
     transmit the final second TRIM reporting message for broadcast to the end-user device via a second service port, different from the first service port.

9. The device of claim 8, the load balancer further configured to:
   determine that a number of TRIMs including information to be added to the first message group exceeds a threshold number of TRIMs;
   remove information from at least an excess number of TRIMs from the first message group; and
   add information from the at least an excess number of TRIMs to the second message group.

10. The device of claim 8, the load balancer further configured to:
    determine the permissible message size based on a TPEG™ message size limitation of the end-user device.

11. The device of claim 8, the load balancer further configured to:
    determine, on a per-market basis, whether information from a particular TRIM is to be included in the first message group or the second message group.

12. The device of claim 8, the load balancer further configured to:
    add information from a particular TRIM to the first message group based on a type of information associated with the first message group; and
    add information from the particular TRIM to the second message group based on a type of information associated with the second message group.

13. The device of claim 8, the load balancer further configured to:
    add information from a particular TRIM to the first message group based on a type of information associated with the first message group; and add information from the particular TRIM to the second message group based on a type of information associated with the second message group.

14. The device of claim 8, further comprising:
at least one encryption module configured to:
encrypt the final first TRIM reporting message using a first key; and
encrypt the final second TRIM reporting message using a second key, different from the first key.

15. A method of preparing travel-related information for delivery to end users, the method comprising:
receiving travel-related-information messages (TRIMs) from one or more information sources;
dividing the TRIMs between a first message group and a second message group, wherein:
the first message group excludes information from at least some TRIMs pertaining to at least one class of roads;
the second message group includes information from the at least some TRIMs excluded from the first message group;
generating a final first TRIM reporting message based on the first message group;
encrypting the final first TRIM reporting message using a first encryption key;
transmitting the final first TRIM reporting message to a station importer to be multiplexed with media content and delivered to an end-user device via a first service port;
generating a second final TRIM reporting message based on the first message group;
encrypting the second final TRIM reporting message using a second encryption key; and
transmitting the second final TRIM reporting message to the station importer to be multiplexed with media content and delivered to the end-user device via a second service port, different from the first service port.

16. The method of claim 15, further comprising:
determining, prior to generating the final first TRIM reporting message, that a size of an intermediate first TRIM reporting message generated from the first message group exceeds a permissible message size;
removing excess information from the first message group to decrease the size of the intermediate first TRIM reporting message to the permissible message size or less; and
adding at least a portion of the excess information to the second message group.

17. The method of claim 16, wherein:
the final first TRIM reporting message is a Transport Protocol Expert Group (TPEG™) message; and
the permissible message size is determined based on a TPEG™ message size limitation of the end-user device.

18. The method of claim 15, further comprising:
determining, prior to generating any TRIM reporting message, that a number of TRIMs including information to be added to the first message group exceeds a threshold number of TRIMs;
removing information from at least an excess number of TRIMs from the first message group; and
adding information from the at least an excess number of TRIMs to the second message group.

19. The method of claim 15, wherein dividing the TRIMs between a first message group and a second message group includes:
excluding, from the first message group, information having a granularity finer than a granularity threshold; and
including, in the second message group, the information excluded from the first message group.

20. The method of claim 15, wherein dividing the TRIMs between a first message group and a second message group includes:
excluding, from the first message group, predictive information for road classes smaller than a threshold size; and
including, in the second message group, predictive information for road classes equal to or larger than a threshold size.

* * * * *